(12) United States Patent
Zhong et al.

(10) Patent No.: US 12,305,712 B2
(45) Date of Patent: May 20, 2025

(54) BEARING SHUNT

(71) Applicant: Schaeffler Technologies AG & Co. KG, Herzogenaurach (DE)

(72) Inventors: Guihui Zhong, Charlotte, NC (US); Venkata Kottapalli, Fort Mill, SC (US); James Brown, Rock Hill, SC (US); Joseph T. Griffin, Monroe, NC (US); John Tate, Cornelius, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 158 days.

(21) Appl. No.: 18/122,740

(22) Filed: Mar. 17, 2023

(65) Prior Publication Data
US 2024/0309915 A1 Sep. 19, 2024

(51) Int. Cl.
F16C 41/00 (2006.01)
F16C 33/66 (2006.01)

(52) U.S. Cl.
CPC ........ F16C 41/002 (2013.01); F16C 33/6681 (2013.01)

(58) Field of Classification Search
CPC ............................ F16C 33/6681; F16C 41/002
See application file for complete search history.

(56) References Cited

U.S. PATENT DOCUMENTS

| 3,271,723 | A | 9/1966 | Willing |
| 3,564,477 | A | 2/1971 | Pompei |
| 4,801,270 | A | 1/1989 | Scarlata |
| 7,136,271 | B2 | 11/2006 | Oh et al. |
| 7,193,836 | B2 | 3/2007 | Oh et al. |
| 7,339,777 | B2 | 3/2008 | Barnard et al. |
| 8,764,301 | B2 | 7/2014 | Winkelmann et al. |
| 9,175,728 | B2 | 11/2015 | White |
| 9,653,193 | B2 | 5/2017 | Windrich et al. |
| 9,790,995 | B2 * | 10/2017 | White .................... F16C 41/002 |
| 10,253,818 | B1 | 4/2019 | Ince et al. |
| 11,384,793 | B2 * | 7/2022 | Schamin ................ F16C 33/784 |
| 2006/0007609 | A1 | 1/2006 | Oh et al. |
| 2016/0032981 | A1 * | 2/2016 | White ................... F16C 41/002 384/448 |
| 2016/0238074 | A1 | 8/2016 | Preis et al. |
| 2023/0015934 | A1 * | 1/2023 | Schamin ............... F16C 41/002 |

* cited by examiner

Primary Examiner — James Pilkington
(74) Attorney, Agent, or Firm — Matthew V. Evans

(57) ABSTRACT

A bearing shunt includes a metal washer, a conductive washer made from a carbon fiber mesh, and a metal cover. The metal washer includes a first annular surface, a lip protruding axially from the first annular surface, and a first plurality of lubricant flow holes. The conductive washer includes a second annular surface contacting the first annular surface and a second plurality of lubricant flow holes aligned with the first plurality of lubricant flow holes. The metal cover is disposed radially inside of the lip and contacts the conductive washer. The metal cover includes a third plurality of lubricant flow holes aligned with the first plurality of lubricant flow holes.

15 Claims, 4 Drawing Sheets

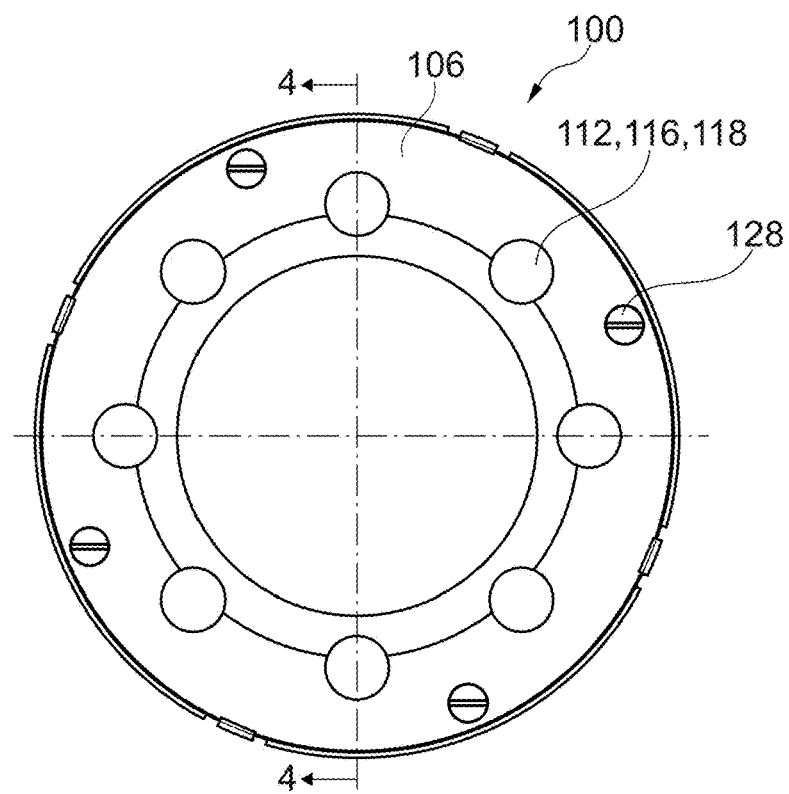
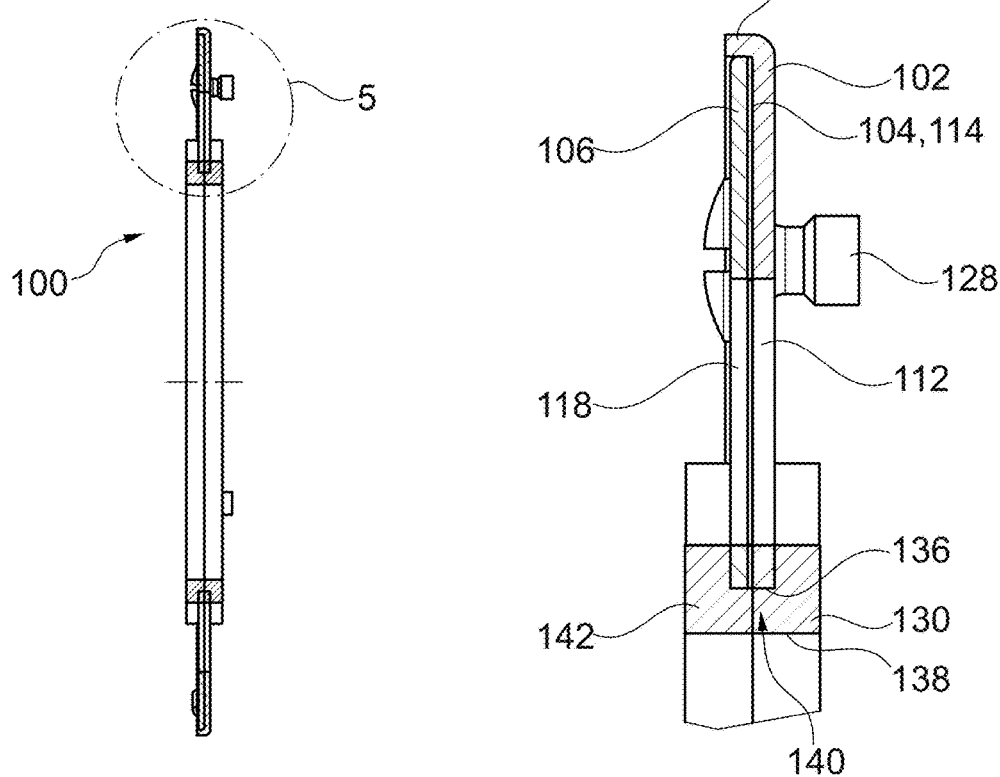
Fig. 3
Fig. 4
Fig. 5

BEARING SHUNT

TECHNICAL FIELD

The present disclosure relates generally to an electrical shunt, and more specifically to a bearing shunt.

BACKGROUND

Stray electrical current from drive motors may cause electrical arcing, pitting, and damage to bearings in automotive hybrid and e-axles. These devices may be built with high speed motors that require high voltage that may further damage the bearings. Shunt devices are used to safely pass electrical current to ground, protecting bearing raceways and rolling elements from electrical discharge machining (EDM). When shunt devices using carbon fibers are used in a wet automatic transmission fluid (ATF), lubricated environment, the carbon fibers can be pushed away from the contact surface by lubricant at high speeds.

Bearings with integral shunts have been created for use in dry environments or with sealed bearing designs. These shunt devices may limit required lubrication flow through the bearing in wet applications. Shunt devices are shown and described in commonly-assigned U.S. Pat. No. 9,175,728 titled ROLLING BEARING WITH INTEGRATED ELECTRICAL SHUNT to White and U.S. Pat. No. 10,253,818 titled BEARING WITH ELECTRICAL SHUNT to Ince et al., hereby incorporated by reference as if set forth fully herein.

SUMMARY

Example aspects of the present disclosure broadly comprise a bearing shunt including a metal washer, a conductive washer made from a carbon fiber mesh, and a metal cover. The metal washer includes a first annular surface, a lip protruding axially from the first annular surface, and a first plurality of lubricant flow holes. The conductive washer includes a second annular surface contacting the first annular surface and a second plurality of lubricant flow holes aligned with the first plurality of lubricant flow holes. The metal cover is disposed radially inside of the lip and contacts the conductive washer. The metal cover includes a third plurality of lubricant flow holes aligned with the first plurality of lubricant flow holes.

In an example embodiment, the metal washer, the conductive washer, and the metal cover are secured together with an electrically conductive adhesive. In some example embodiments, the metal cover is secured to the metal washer at the lip. In an example embodiment, the lip includes staked portions that secure the metal cover to the metal washer. In an example embodiment, the bearing shunt also includes mounting screws for securing the bearing shunt to a bearing ring.

In some example embodiments, the bearing shunt also includes a first flow limiter with an outer diameter having scallops aligned with the first plurality of lubricant flow holes. In some example embodiments, the metal washer has a first inside diameter and the first flow limiter has a second inside diameter, less than the first inside diameter. In an example embodiment, the first flow limiter has an inner lip disposed radially within the first inside diameter and contacting the conductive washer. In some example embodiments, the first flow limiter is electrically conductive and formed from a non-woven carbon fiber fleece or felt. In an example embodiment, the first flow limiter is secured to the metal washer or the metal cover with an electrically conductive adhesive. In some example embodiments, the bearing shunt also includes a second flow limiter with an outer diameter having scallops aligned with the first plurality of lubricant flow holes. In an example embodiment, the first flow limiter is electrically conductive, formed from non-woven carbon fiber fleece or felt, and secured to the metal washer with electrically conductive adhesive, and the second flow limiter is electrically conductive, formed from non-woven carbon fiber fleece or felt, and secured to the cover with electrically conductive adhesive.

Other example aspects broadly comprise a bearing assembly including an outer ring having a race, a plurality of rolling elements arranged to travel along the race, and the bearing shunt secured to the outer ring. In an example embodiment, the bearing shunt is secured to the outer ring by screws. In an example embodiment, the bearing assembly also includes a conductive adhesive disposed on the screws.

BRIEF DESCRIPTION OF THE DRAWINGS

FIG. 3 illustrates a front view of the bearing shunt of FIG. 1.

FIG. 4 illustrates a cross-sectional view of the bearing shunt of FIG. 1 taken generally along line 4-4 in FIG. 3.

FIG. 5 illustrates a detail view of encircled region 5 in FIG. 4.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
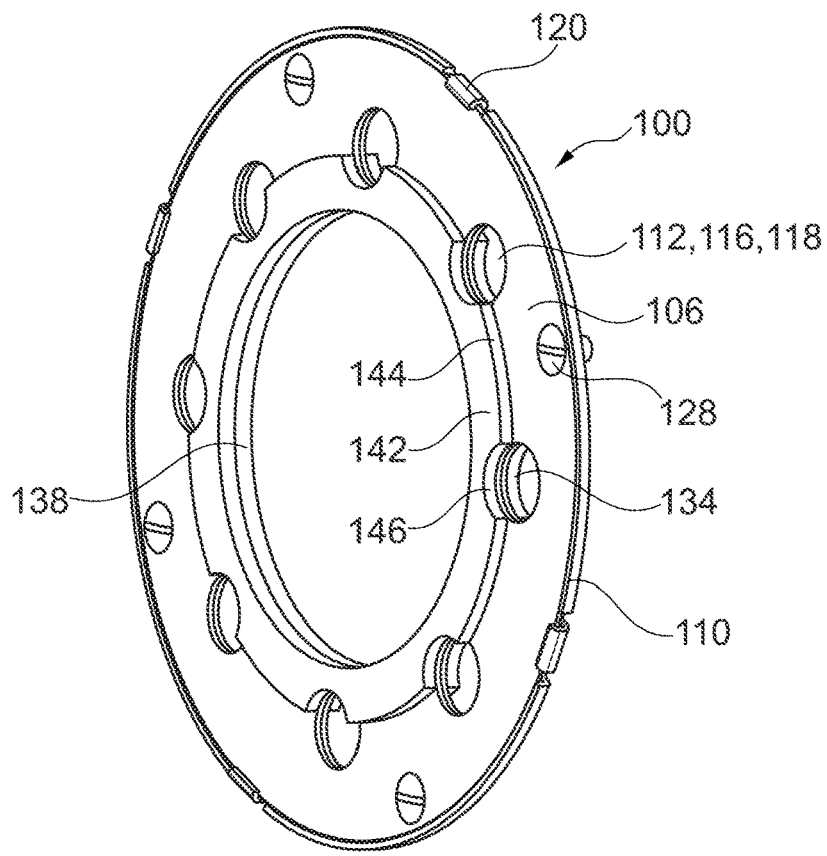
FIG. 1 illustrates a perspective view of a bearing shunt according to an example embodiment.
Figure 2:
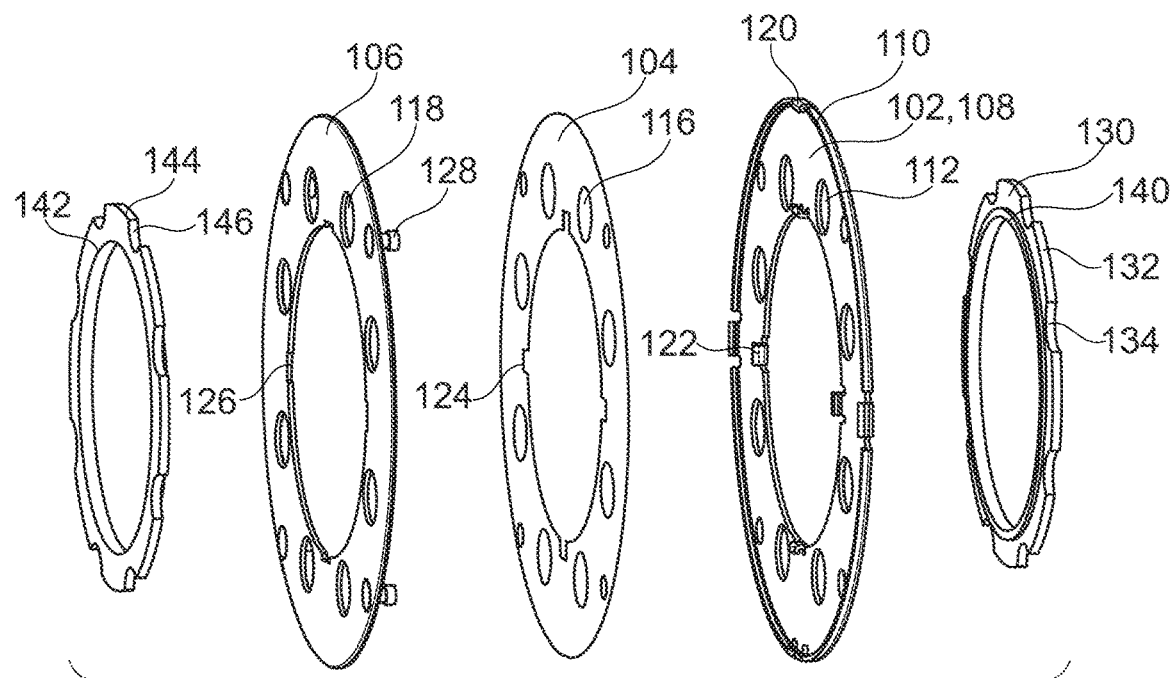
FIG. 2 illustrates an exploded perspective view of the bearing shunt of FIG. 1.

The following description is made with reference to FIGS. 1-5. FIG. 1 illustrates a perspective view of bearing shunt 100 according to an example embodiment. FIG. 2 illustrates an exploded perspective view of the bearing shunt of FIG. 1. FIG. 3 illustrates a front view of the bearing shunt of FIG. 1. FIG. 4 illustrates a cross-sectional view of the bearing shunt of FIG. 1 taken generally along line 4-4 in FIG. 3. FIG. 5 illustrates a detail view of encircled region 5 in FIG. 4. Bearing shunt 100 includes metal washer 102, conductive washer 104 made from a carbon fiber mesh, and metal cover 106. The carbon fiber layer of the conductive washer is sandwiched between the metal washer and the metal cover. Metal washer 102 and metal cover 106 may be silver coated for improved conductivity. Metal washer 102 includes annular surface 108, lip 110 protruding axially from annular surface 108, and lubricant flow holes 112. Conductive washer 104 includes annular surface 114, contacting annular surface 108, and lubricant flow holes 116 aligned with lubricant flow holes 112. Metal cover 106 is disposed radially inside of the lip and contacts the conductive washer. The metal cover includes lubricant flow holes 118 aligned with lubricant flow holes 112. In other words, lubricant flow holes 112, 116 and 118 are aligned so that a lubricant flowing through bearing shunt 100 can easily flow through the three sets of lubricant flow holes with little or no disruption to carbon fibers forming the carbon fiber mesh of conductive washer 104.

Although not explicitly shown in the figures, the metal washer, the conductive washer, and the metal cover are secured together with an electrically conductive adhesive (ECA, e.g., electrically conductive epoxy). For example, the ECA may contain graphite, nickel, or silver to enhance its conductive properties, and may be a one or two part epoxy or silicone. In other words, the conductive adhesive is applied in between to guarantee good electrical connection between the components. Metal cover 106 is secured directly to metal washer 102 at lip 110. For example, as best shown in FIGS. 1 and 5, lip 110 includes staked portions 120 that secure the metal cover to the metal washer. In other words, the metal washer is staked to hold the metal washer, the conductive washer and the metal cover together. Portions 120 may also be formed tabs that retain an outer diameter of cover 106, for example.

Figure 6:
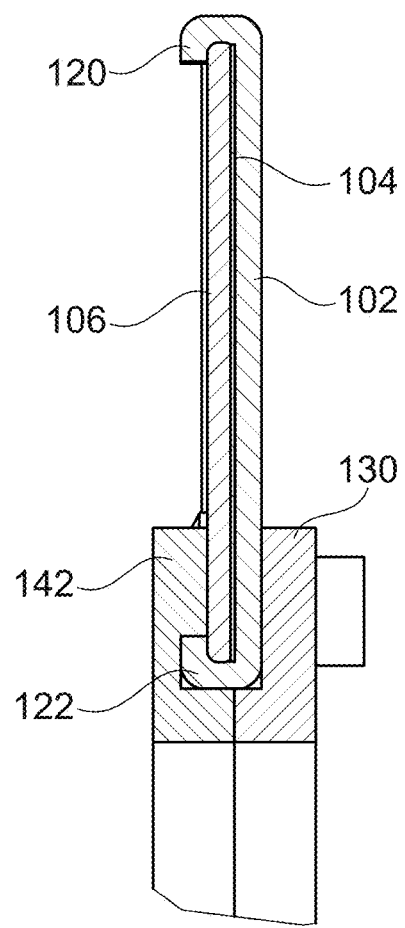
FIG. 6 illustrates an alternative embodiment of the detail view of encircled region 5 in FIG. 4.

The following description is made with reference to FIGS. 1-6. FIG. 6 illustrates an alternative embodiment of the detail view of encircled region 5 in FIG. 4. Similar to portions 120 discussed above and as best shown in FIGS. 2 and 6, formed tabs 122 extend from annular surface 108 through recessed areas 124 in conductive washer 104 to further grip recessed areas 126 of metal cover 106. Mounting screws 128 extend through respective apertures in metal washer 102, conductive washer 104 and metal cover 106 for securing the bearing shunt to a bearing ring as described in more detail below.

Bearing shunt 100 also includes flow limiter 130 with outer diameter 132 having scallops 134 aligned with lubricant flow holes 112. Flow limiter 130 is arranged to direct fluid through the flow holes and away from an inner portion of conductive washer 104 contacting an inner shaft that is not shown here but discussed in more detail below. Lubricant flow at the interface of the conductive washer and the shaft may displace carbon fibers of the carbon fiber mesh and limit effectiveness of the bearing shunt. By directing flow away from the interface, the bearing shunt is able to better accommodate a flow of electricity between a bearing outer ring and the shaft, thereby limiting electrical discharge machining (EDM) of bearing rolling elements.

Figure 7:
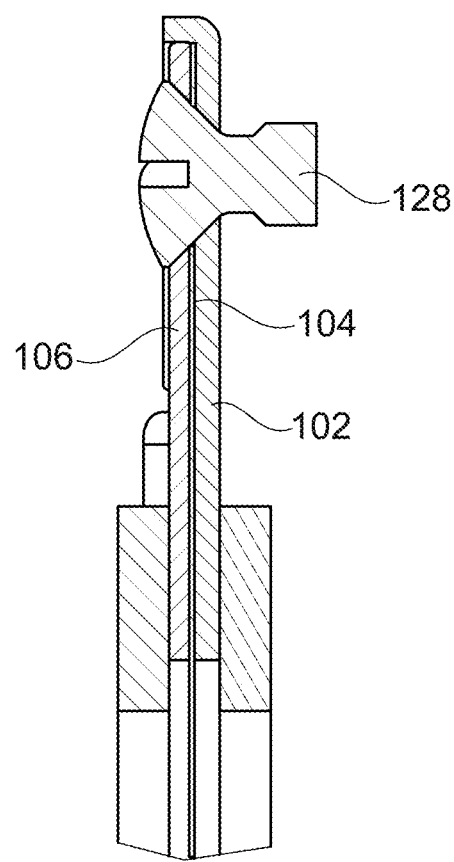
FIG. 7 illustrates an alternative embodiment of the detail view of encircled region 5 in FIG. 4.

The following description is made with reference to FIGS. 1-7. FIG. 7 illustrates an alternative embodiment of the detail view of encircled region 5 in FIG. 4. Metal washer 102 includes inside diameter 136 and flow limiter 130 has inside diameter 138, less than the metal washer diameter 136. In other words, the flow limiter extends radially inward further than the metal washer. As best shown in FIGS. 2 and 5, for example, flow limiter 130 includes inner lip 140 disposed radially within metal washer inside diameter 136 and contacting the conductive washer. In the embodiment shown in FIG. 7, the flow limiter does not include an inner lip and there is a gap between the flow limiter and the conductive washer.

Flow limiter 130 is electrically conductive and may be formed from a non-woven carbon fiber fleece or felt. Thus, the flow limiter is flexible and can be made to hug a shaft (not shown but discussed below) with minimal friction. By being conductive, the flow limiter can also provide an additional electrical path (in addition to the conductive washer) to protect bearing components from electrical current passage (ECP) damage. Similar to the ECA discussed above, flow limiter 130 is secured to the metal washer or the metal cover with an electrically conductive adhesive. Shunt 100 also includes flow limiter 142 with outer diameter 144 having scallops 146 aligned with the lubricant flow holes 112. Flow limiters 130 and 142 are electrically conductive, formed from non-woven carbon fiber fleece or felt, and secured to the metal washer with electrically conductive adhesive.

Figure 8:
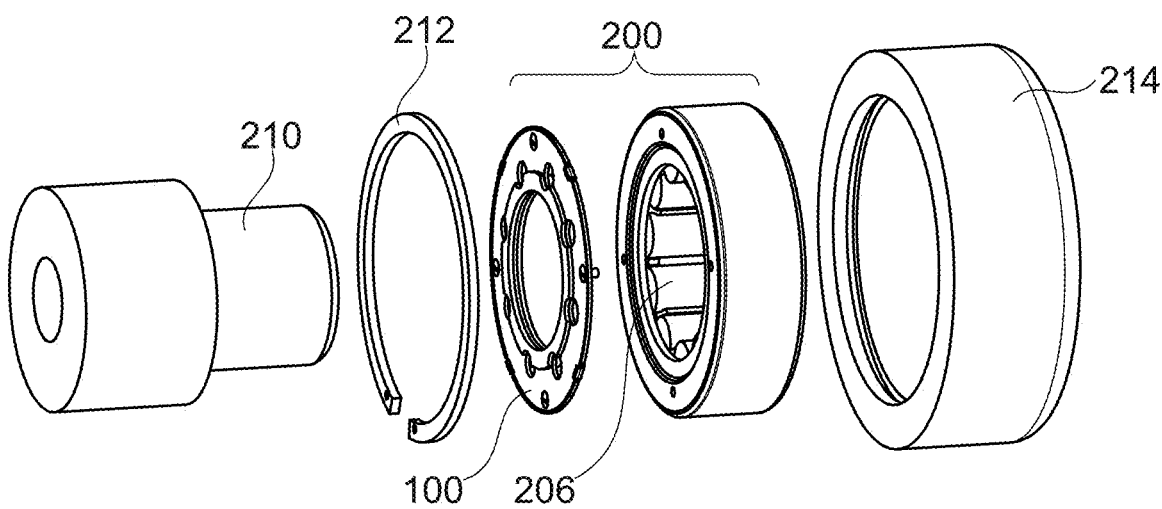
FIG. 8 illustrates an exploded perspective view of a bearing assembly including the bearing shunt of FIG. 1.
Figure 9:
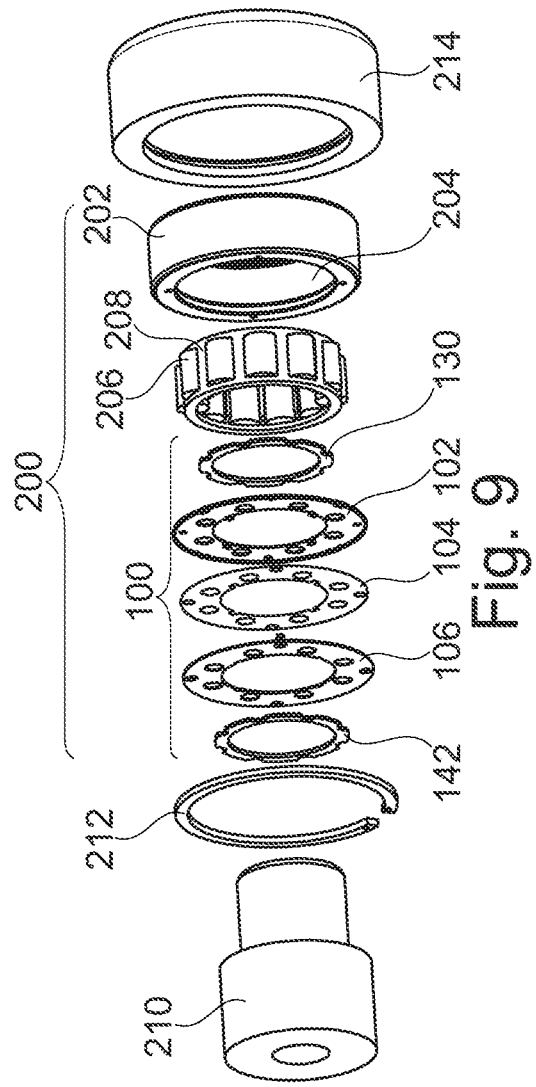
FIG. 9 illustrates an exploded perspective view of the bearing assembly of FIG. 8 showing the bearing shunt exploded.
Figure 12:
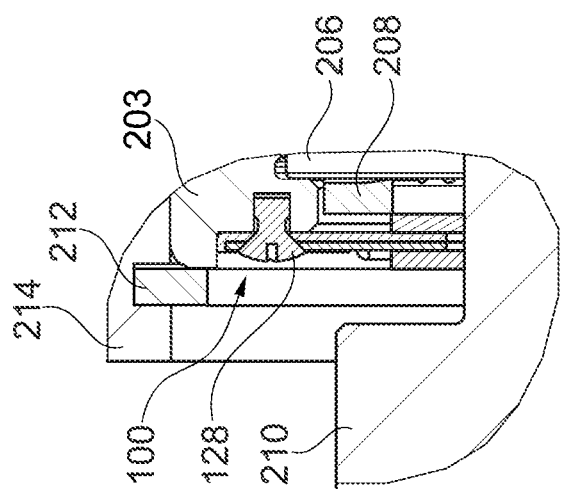
FIG. 12 illustrates an alternative embodiment of the detail view of encircled region 11 in FIG. 10.
Figure 11:
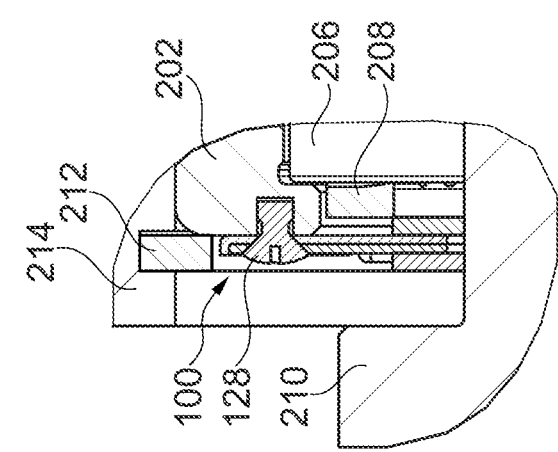
FIG. 11 illustrates a detail view of encircled region 11 in FIG. 10.
Figure 10:
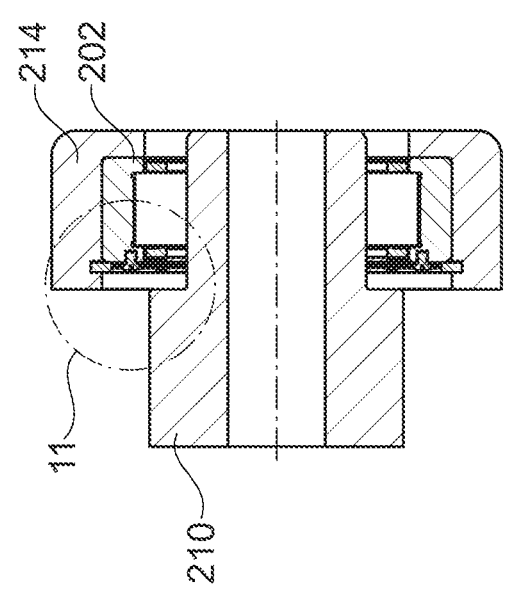
FIG. 10 illustrates a cross-sectional view of the bearing assembly of FIG. 8.

The following description is made with reference to FIGS. 1-12. FIG. 8 illustrates an exploded perspective view of bearing assembly 200 including bearing shunt 100 of FIG. 1. FIG. 9 illustrates an exploded perspective view of the bearing assembly of FIG. 8 showing the bearing shunt exploded. FIG. 10 illustrates a cross-sectional view of the bearing assembly of FIG. 8. FIG. 11 illustrates a detail view of encircled region 11 in FIG. 10. FIG. 12 illustrates an alternative embodiment of the detail view of encircled region 11 in FIG. 10. Bearing assembly 200 includes outer ring 202 with race 204, rolling elements 206 arranged to travel along the race, and bearing shunt 100 secured to the outer ring. Although rolling elements 206 are shown as cylindrical rollers and bearing assembly is a cylindrical roller bearing (CRB), shunt 100 may be incorporated into other styles of bearings. For example, bearing 200 may be a tapered roller bearing (TRB) or a deep groove ball bearing (DGBB). The bearing assembly also includes cage assembly 208 guiding rolling elements 206.

Shaft 210 is arranged to contact the conductive washer and the rolling elements 206. That is, the conductive washer is formed with an inside diameter less than an outside diameter of the shaft so that the fibers of the carbon fiber mesh are slightly displaced when the bearing assembly is installed on the shaft. This slight displacement improves electrical conductivity between the bearing shunt and the shaft. In other words, the fibers act like brush-contacts to the shaft to help break the oil film and establish a good electrical connection. This may be especially useful in applications where the shaft is displaceable relative to the outer ring.

Retaining ring (e.g., snap ring) 212 is arranged to retain the bearing assembly in housing 214. As shown in FIG. 11, for example, bearing shunt 100 is secured to outer ring 202 by screws 128. A conductive adhesive or threadlocker is disposed on the screws for improved electrical conductivity between the outer ring and the bearing shunt. FIG. 12 shows an alternative embodiment where the bearing shunt is disposed in a recessed portion of outer ring 203. In other words, FIG. 11 shows the bearing shunt mounted side-by-side with the bearing, and FIG. 12 shows the bearing shunt integrated into the bearing. Integrating the bearing shunt with the bearing outer ring provides additional contact with the bearing outer ring. This contact may provide conductivity similar to that provided by the mounting screws, and it may be possible to eliminate the mounting screws in the integrated design.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

102 Metal washer
100 Bearing shunt
104 Conductive washer
106 Metal cover
108 Annular surface (first, metal washer)
110 Lip
112 Lubricant flow holes (first, metal washer)
114 Annular surface (second, conductive washer)
116 Lubricant flow holes (second, conductive washer)
118 Lubricant flow holes (third, metal cover)
120 Staked portions (lip)
122 Formed tabs (metal washer)
124 Recessed areas (conductive washer)
126 Recessed areas (metal cover)
128 Mounting screws
130 Flow limiter (first)
132 Outer diameter (first flow limiter)
134 Scallops (first flow limiter)
136 Inner diameter (metal washer)
138 Inner diameter (first flow limiter)
140 Inner lip (first flow limiter)
142 Flow limiter (second)
144 Outer diameter (second flow limiter)
146 Scallops (second flow limiter)
200 Bearing assembly
202 Outer ring
203 Outer ring
204 Race (outer ring)
206 Rolling elements
208 Cage assembly
210 Shaft
212 Retaining ring
214 Housing

What is claimed is:

1. A bearing shunt, comprising:
   a metal washer comprising:
      a first annular surface;
      a lip protruding axially from the first annular surface; and
      a first plurality of lubricant flow holes;
   a conductive washer made from a carbon fiber mesh, the conductive washer comprising:
      a second annular surface contacting the first annular surface; and
      a second plurality of lubricant flow holes aligned with the first plurality of lubricant flow holes; and
   a metal cover disposed radially inside of the lip and contacting the conductive washer, the metal cover comprising:
      a third plurality of lubricant flow holes aligned with the first plurality of lubricant flow holes.

2. The bearing shunt of claim 1 wherein the metal washer, the conductive washer, and the metal cover are secured together with an electrically conductive adhesive.

3. The bearing shunt of claim 1 wherein the metal cover is secured to the metal washer at the lip.

4. The bearing shunt of claim 3 wherein the lip comprises staked portions that secure the metal cover to the metal washer.

5. The bearing shunt of claim 1 further comprising mounting screws for securing the bearing shunt to a bearing ring.

6. The bearing shunt of claim 1 further comprising a first flow limiter comprising an outer diameter having scallops aligned with the first plurality of lubricant flow holes.

7. The bearing shunt of claim 6 wherein:
   the metal washer has a first inside diameter; and
   the first flow limiter has a second inside diameter, less than the first inside diameter.

8. The bearing shunt of claim 7 wherein the first flow limiter comprises an inner lip disposed radially within the first inside diameter and contacting the conductive washer.

9. The bearing shunt of claim 6 wherein the first flow limiter is electrically conductive and formed from a nonwoven carbon fiber fleece or felt.

10. The bearing shunt of claim 9 wherein the first flow limiter is secured to the metal washer or the metal cover with an electrically conductive adhesive.

11. The bearing shunt of claim 6 further comprising a second flow limiter comprising an outer diameter having scallops aligned with the first plurality of lubricant flow holes.

12. The bearing shunt of claim 11 wherein:
the first flow limiter is:
- electrically conductive;
- formed from non-woven carbon fiber fleece or felt; and
- secured to the metal washer with electrically conductive adhesive; and the second flow limiter is:
- electrically conductive;
- formed from non-woven carbon fiber fleece or felt; and
- secured to the cover with electrically conductive adhesive.

13. A bearing assembly comprising:
an outer ring comprising a race;
a plurality of rolling elements arranged to travel along the race; and
a bearing shunt of claim 1 secured to the outer ring.

14. The bearing assembly of claim 13 wherein the bearing shunt is secured to the outer ring by screws.

15. The bearing assembly of claim 14 further comprising a conductive adhesive disposed on the screws.

* * * * *